United States Patent
Jaffke et al.

(10) Patent No.: US 6,786,521 B1
(45) Date of Patent: Sep. 7, 2004

(54) COMPOSITE PLUG WITH MESH SUBSTRATE FOR USE DURING VEHICLE MANUFACTURE AND METHOD OF MANUFACTURING THE SAME

(76) Inventors: Elmer L. Jaffke, 15621 Pleasant Apt. C, Allen Park, MI (US) 48101; Lenny B. Francis, II, 140 Kendall Apt. C, Kalamazoo, MI (US) 49006

( * ) Notice: Subject to any disclaimer, the term of this patent is extended or adjusted under 35 U.S.C. 154(b) by 0 days.

(21) Appl. No.: 10/136,563

(22) Filed: May 1, 2002

(51) Int. Cl.$^7$ ................................................ B60J 9/00
(52) U.S. Cl. .................. 296/1.06; 296/204; 296/900.01
(58) Field of Search ................................. 296/1.05, 204, 296/900.01, 1.06; 220/229, DIG. 19; 215/355; 428/548, 550, 566, 590, 596

(56) References Cited

U.S. PATENT DOCUMENTS

| | | | |
|---|---|---|---|
| 2,836,529 A | * | 5/1958 | Morris ........................ 442/187 |
| 3,072,497 A | * | 1/1963 | Guglielmo .................. 428/135 |
| 3,264,034 A | * | 8/1966 | Lawson ................. 297/452.57 |
| 3,284,260 A | * | 11/1966 | Best ............................ 156/212 |
| 3,382,889 A | | 5/1968 | Heinz et al. ............. 137/525.3 |
| 3,606,446 A | | 9/1971 | Leslie ....................... 296/28 R |
| 3,701,560 A | | 10/1972 | Emmerson .................. 296/1 R |
| 3,851,794 A | | 12/1974 | Hehl ........................... 220/308 |
| 3,889,841 A | | 6/1975 | Edmonds .................... 220/200 |
| 3,935,686 A | | 2/1976 | Dozois ......................... 52/302 |
| 4,176,877 A | | 12/1979 | Schulz et al. ............... 296/208 |
| 4,290,536 A | | 9/1981 | Morel ......................... 220/359 |
| 4,363,420 A | | 12/1982 | Andrews .................... 220/307 |
| 4,391,384 A | | 7/1983 | Moore, III et al. .......... 220/359 |
| 4,478,777 A | | 10/1984 | Hoppie et al. .............. 264/102 |
| 4,494,671 A | | 1/1985 | Moore, III et al. ......... 220/256 |
| 4,560,083 A | | 12/1985 | Danico ....................... 220/307 |
| 4,700,981 A | | 10/1987 | Seyler ......................... 296/1 F |
| 4,817,262 A | | 4/1989 | Seyler ........................... 29/458 |
| 4,930,459 A | | 6/1990 | Coffenberry ............. 123/41.15 |
| 5,040,803 A | | 8/1991 | Cieslik et al. ................. 277/12 |
| 5,071,022 A | | 12/1991 | Sick ............................ 220/307 |
| 5,131,497 A | | 7/1992 | Rogers ........................ 184/1.5 |
| 5,267,667 A | | 12/1993 | Cozzani ...................... 220/307 |
| 5,279,092 A | | 1/1994 | Williamsen et al. .......... 52/514 |
| 5,290,079 A | * | 3/1994 | Syamal ....................... 293/120 |
| 5,505,324 A | | 4/1996 | Danico ........................ 220/201 |
| 5,558,346 A | | 9/1996 | Hartery ....................... 277/189 |
| 5,709,309 A | | 1/1998 | Gallagher et al. .......... 220/229 |
| 5,873,623 A | | 2/1999 | Dunton et al. .............. 296/154 |
| 6,103,341 A | | 8/2000 | Barz et al. .................. 428/147 |
| 6,187,850 B1 | | 2/2001 | Kawamura et al. ......... 524/425 |

FOREIGN PATENT DOCUMENTS

| | | | | |
|---|---|---|---|---|
| JP | 406263065 A | * | 9/1994 | ................. 296/1.1 |
| NL | 6802870 | * | 2/1968 | ................. 296/1.1 |

* cited by examiner

Primary Examiner—Lori L. Coletta
(74) Attorney, Agent, or Firm—Gifford, Krass, Groh, Sprinkle, Anderson & Citkowski, P.C.

(57) ABSTRACT

A composite material for application during a vehicle manufacturing stage. A selected thermoplastic/thermoset material encapsulates a sheet of a mesh substrate, typically resulting from a first heat forming stage. The composite material is formed into a desired three-dimensional shape. A second heating stage is applied to bond and seal the material to the vehicle. The material selection of the thermoplastic/thermoset may further incorporate a desired coefficient of thermal expansion to provide a desired degree of expansion of the material once applied to the vehicle. The material section of the thermoplastic/thermoset may further incorporate a desired structural enhancement to provide a desired degree of structural rigidity of the material once applied to the vehicle.

7 Claims, 4 Drawing Sheets

COMPOSITE PLUG WITH MESH SUBSTRATE FOR USE DURING VEHICLE MANUFACTURE AND METHOD OF MANUFACTURING THE SAME

BACKGROUND OF THE INVENTION

1. Field of the Invention

The present invention relates generally to vehicle sealing or plugging devices. More particularly, the present invention discloses a composite plug assembly and related method of manufacture for use in particular during vehicle manufacture. Such plugs are capable of being designed for such varied purposes as sealing pre-formed vehicle drainage apertures, being applied in layer form to provide heat and sound insulation to such as vehicle undercarriages, as well as being configured in a wrapping or rolled three-dimensional arrangement for inserting in a longitudinally extending fashion for providing sealing and baffling characteristics to such as elongated vehicle pillars and the like. The composite material can also be used as a formed panel such as a door inner panel, hood or deck lid inner panel, roof bows etc.

2. Description of the Prior Art

The prior art is well documented with examples of closure and plug assemblies for use with vehicles. In particular application, vehicle manufacture contemplates for providing for drainage of a conventional vehicle paint application in the manufacturing process. Upon finished manufacture of the vehicle, it is desirous to plug or otherwise seal these "engineered" apertures.

Examples of prior art sealing plugs and devices include U.S. Pat. Nos. 4,700,981 and 4,817,262, both issued to Seylor, and each of which teaching a paint drain closure and vehicle panel in the form of a one-piece sheet metal plug of inverted hat-shaped configuration (see FIG. 17 in particular). The closure plug in each instance is preferably disclosed as being formed of a deformable sheet metal and is supported and inserted, preferably through the use of a magnetically supporting and applicating tool, into the floor pan/panel opening in the vehicle body and prior to being mechanically sealed. Alternatively, a baking cycle is employed to soften and expand a sealant ring in order to produce a permanent adhesive bond between the parts. The plugs in Seylor further teach the provision of such as elongated annular ribs formed integrally with the side walls of the plugs and which, upon rotation of the inserted plug, are urged into a locking position beneath associated tabs or shoulders of the apertured panel to which it is applied.

U.S. Pat. No. 4,494,671, issued to Moore, teaches an auto body panel hole closure including a plate with dimensions complementary to a hole and a gasket member secured to the top of the plate and including a somewhat larger dimension than the hole. The gasket further includes a first or bottom side low melt layer and a second or top side copolymer layer. Upon exposure to elevated temperatures during baking, the gasket melts over the plate and adheres to the panel to create a seal between the plate and the panel.

U.S. Pat. No. 5,267,667, issued to Cozzani, teaches a plug adapted to be fixed by a hot melt adhesive into an opening in an auto body plate and which further includes a molded plastic material body and a bead of hot melt adhesive deposited onto a peripheral surface of the body and around a surface transverse to the peripheral surface. The body further includes a snap-fastener blade having an insertion ramp and a retaining lip such that the insertion ramp bears against the edge of the opening upon placement of the plug.

U.S. Pat. No. 3,606,446, issued to Leslie, teaches a drain hole plug assembly including the provision of a retainer plug with a plug body portion inserted into a drain hole of a panel and to be secured therein. The retainer plug supports a flexible washer serving as a flap valve and which is retained against an outer face of the panel by an annular flange. The flexible washer is protected from heat by an annular flange on the plug retainer which extends outwardly and is spaced from the flexible washer.

An additional and large grouping of similar patents are referenced in the prior art and include such as U.S. Pat. No. 5,505,324, issued to Danico, and which teaches a hole plug with heat expansible material. U.S. Pat. No. 4,290,536, issued to Morel, teaches a dish plug type seal with elastic collar and peripheral cord which is thermofusible to secure about aperture. U.S. Pat. No. 4,363,420, issued to Andrews, teaches a sealing plug with abutting flange portion and flowable sealant material which, when heated to a melting temperature below the melting point of the plug material, flows in order to adhere between an edge surface of an associated panel apertures and at least part of an insert portion. Still additional prior art patents of interest include Cieslik U.S. Pat. No. 5,040,803 (expandable sealant plug), Heinz U.S. Pat. No. 3,382,889 (sealing cap for vehicle body drain and including annular undercut rib), Dozois U.S. Pat. No. 3,935,686 (mechanically collapsible drain plug), and Emmerson U.S. Pat. No. 3,701,560 (auto vehicle body access and drain plug).

SUMMARY OF THE PRESENT INVENTION

The present invention discloses a composite plug assembly and related method of manufacture for use in particular during vehicle manufacture. The composite assembly and method of the present invention is a distinct improvement over the prior art in that it is the first to provide a mesh screen substrate in use with a thermoplastic/thermoset material and in order to increase the durability and performance (these including sealing, structural, and adhering) characteristics of the composite plug.

As also previously described, such plugs are capable of being designed for such varied purposes as sealing pre-formed vehicle drainage apertures, being applied in layer form to provide heat and sound insulation to such as vehicle undercarriages, as well as being configured in a formed or rolled three-dimensional arrangement for inserting into and/or attaching in a cavity for providing sealing and baffling characteristics to such as elongated vehicle pillars and the like.

In every variant, the composite assembly includes the provision of a selected thermoplastic/thermoset material, hereinafter referred to as a sheet, having a selected length, width and thickness if desired. A sheet of a mesh substrate of a selected length, width and thickness, such as constructed from a suitable metal or metal alloy, is substantially encapsulated by the thermoplastic/thermoset material upon first arraying the heated sheet against such as an upper surface of the mesh substrate and then applying pressure at a first heating stage at a selected temperature range.

The resultant encapsulating thermoplastic/thermoset sheet (with interiorly disposed mesh substrate) substantially retains its initial configuration. It is however also envisioned that the encapsulating composite sheet and substrate may further be formed into a three-dimensional shape, such as a plug, through the application of a suitable stamping or die forming operation and for particular use in securing to and sealing such as a vehicle paint drainage aperture as previously described.

A laterally directed projection, such as a rim, may be formed into a recessed cup portion of the defined plug shape. Upon fitting the recessed cup into the vehicle aperture, and seating the encircling rim onto the vehicle surface proximate the opening, a secondary heating application is applied, beyond the softening point of the thermoplastic/thermoset material, and which will cause the material to become sufficiently molten so as to flow into and around the aperture and surrounding vehicle (plate) surface area. The thermoplastic/thermoset material may further exhibit a desired coefficient of thermal expansion and so that, upon application of the secondary heating stage, expands to the point that it adequately bonds and seals such as the vehicle opening.

As also previously described, the composite material is capable of being applied in layer form to provide heat and sound insulation to such as vehicle undercarriage or other suitable surface(s) of the vehicle. A further variation of the encapsulating mat configuration of the thermoplastic/thermoset material provides for an apertured section to be formed within the mat configuration, thus revealing the underlying mesh substrate.

The mat configuration is then welded in place or has holes pierced into it through which push-in or screw type fasteners are used to hold in place. The mat configuration is placed over a stripped or coated and substantially planar metal surface associated with a vehicle body and, upon application of the secondary heating stage (such as again typically occurring during such as a conventional paint bake cycle) the composite and vehicle body panel are bound together.

As also again previously described, the mat may again be configured by forming, wrapping or rolling about an axis prior to inserting or attaching into a cavity defined by a vehicle pillar or the like and prior to the secondary heating and expansion/sealing stage of the composite material. In this application, it is contemplated that the composite material may expand thermally according to its materially defined coefficient and in order to substantially fill and seal within the pillar, as well in specific instances to define a desired gap to provide for appropriate baffling of fluids through and out of the pillar.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring now to the appended drawing figures, a composite material assembly and related method of manufacture is illustrated according to a series of preferred variants and for use in particular during vehicle manufacture. As described previously, the composite assembly and method of assembly of the present invention is a distinct improvement over the prior art in that it is the first to provide a mesh screen substrate in use with an encapsulating and thermoplastic/thermoset material in order to increase the durability and performance (sealing and adhering) characteristics of the composite assembly. Referring now to the several views, the succeeding and alternating variants of the present invention will now be described as follows.

Figure 1:
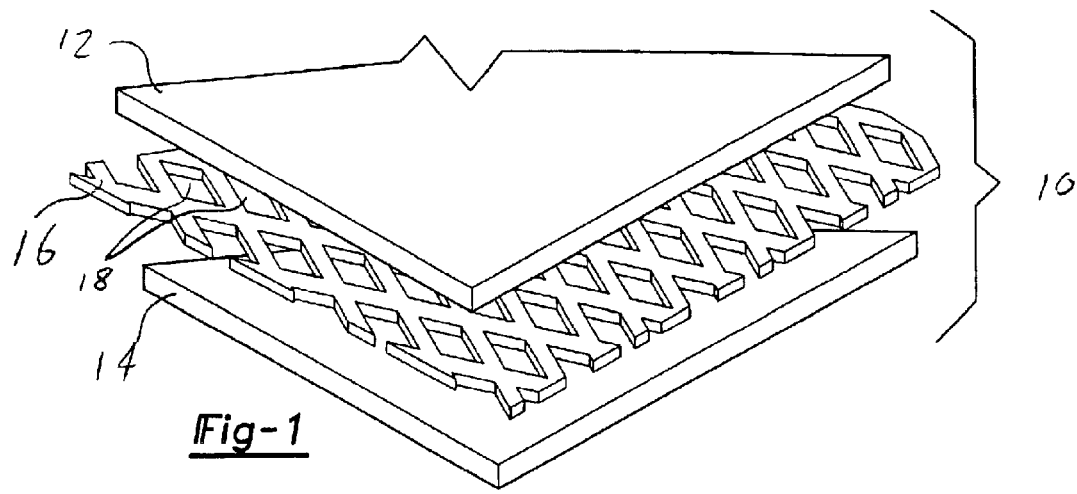
FIG. 1 is a perspective view of an initial manufacturing step of a composite thermoplastic/thermoset sheet and mesh substrate according to the present invention and further illustrating varied options in the pre-application of the thermoplastic/thermoset sheet to either upper and/or lower disposed faces of the mesh substrate.

Referring first to FIG. 1, an illustration is shown at 10 in perspective view of an initial manufacturing step for the composite assembly and which includes the provision of one or more sheets of thermoplastic/thermoset material, see at 12 and 14. The sheets of material 12 and 14, as will be further described, are understood to provide a scaler/adhesive material for the purpose of binding to various locations of the vehicle. A sheet of a mesh substrate 16 is provided and further includes a latticework pattern further defined by a plurality of interior apertures 18. The mesh substrate 16 is preferably constructed of a metal or other suitable material having the necessary characteristics of flexibility and heat resistance and further which is heat resistant to significantly higher temperatures than the thermoplastic/thermoset sheets 12 and 14.

The sheets of thermoplastic/thermoset material 12 and 14 are constructed of a desired plasticized or like composite material exhibiting thermoplastic characteristics, i.e., material softening and flowability above a desired temperature range. Each of the thermoplastic/thermoset sheets 12 and 14 further exhibits a selected length, width and thickness if desired and such that they adopt an overall planar configuration. It is however understood that the present invention is not limiting as to the shape and configuration of the thermoplastic/thermoset sheets, either as initially configured or after being applied to a desired location of the vehicle.

The mesh substrate 16 is provided with an overall shape and configuration similar to that of the thermoplastic/thermoset material and so that, according to variants of the present invention, the thermoplastic/thermoset sheets 12 and 14 may be pre-applied from either upper and/or lower disposed faces of the mesh substrate 16. Having shown two sheets 12 and 14 of thermoplastic/thermoset material, the preferred variant however contemplates the provision of only a single sheet of material 12 placed against a corresponding upper face of the mesh substrate 16.

In the preferred variant, placement of the sheet 12 occurs during which the thermoplastic/thermoset material is heated to its softening point and is caused to flow through the underlaying mesh substrate 16. Although not shown, a suitable heating device or other suitable heat generating environment is created in order to cause the thermoplastic/thermoset material and/or mesh substrate to be subjected to the desired temperature.

One preferred application contemplates the initial heating stage being provided at a temperature of approximately 200° Fahrenheit, which is calculated to correspond to a given material content of the thermoplastic/thermoset sheet (such as again at 12) which will not soften in use upon the vehicle given varying environmental parameters and which, when baking, will place the sheet at its softening point to cause it to flow through the underlaying mesh substrate 16. It is also contemplated that other and additional conventional procedures including, without limitation, extruding the thermoplastic/thermoset material onto the mesh substrate. Also using a suitable nip roller or roller process (not shown) may be incorporated into the initial stages and heating stage to assist in placing and/or drawing the softened thermoplastic/thermoset material onto and/or through the mesh substrate.

Figure 2:
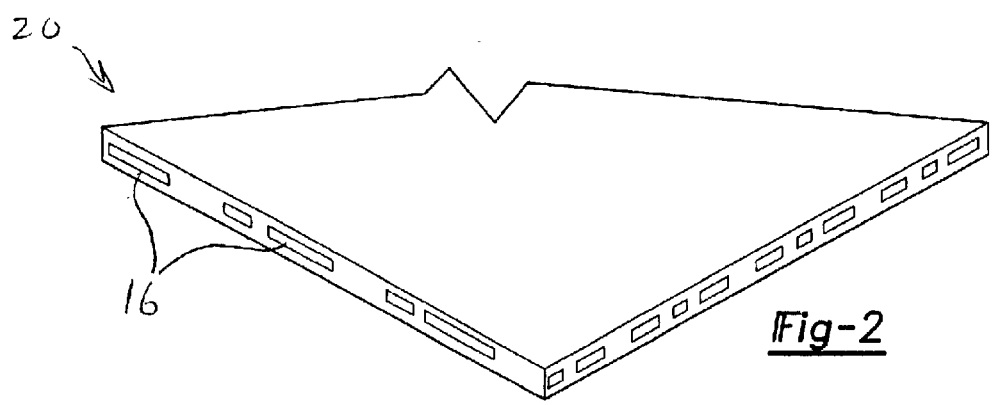
FIG. 2 is an illustration of an intermediate step of the pre-manufacturing process initiated in FIG. 1 and further illustrating a composite thermoplastic/thermoset sheet, resulting from an initial heat application, evenly encapsulating around the mesh substrate.

Referring now to FIG. 2, a furthering illustration is shown at 20 of an intermediate step of the pre-manufacturing process initiated in FIG. 1 and which illustrate a composite thermoplastic/thermoset sheet resulting from an initial heat application and in which the initially heated (or baked) thermoplastic material is evenly encapsulating around the mesh substrate 16. In this illustration, the substrate 16 is partially or, as preferably shown, entirely encased in the scaling/adhesive thermoplastic/therinoset sheet (see again previously at 12 and, potentially, 14) and becomes bonded essentially into a single ply composite sheet.

Figure 3:
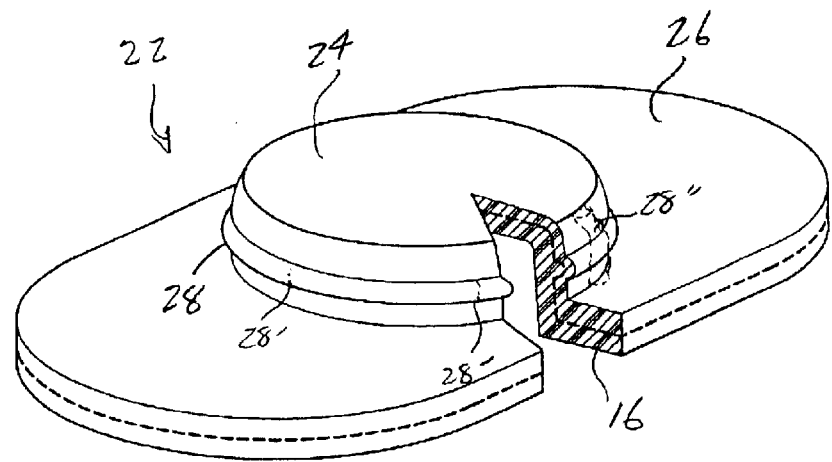
FIG. 3 is a furthering illustration, in perspective, of a three-dimensionally die cut or stamped plug configuration, according to one preferred variant of the present invention.

Referring to FIG. 3, an illustration 22 is shown, in perspective, of a three-dimensionally die cut or stamped plug configuration according to one preferred variant of the present invention. The plug configuration 22 results from the application of a conventional three-dimensional forming operation such as including a stamping or die forming operation (not shown). In this fashion, the initially baked thermoplastic/thermoset sheet 20 with embedded substrate is redefined in a three-dimensional shape, such as including a centrally recessed cup portion 24 and a connected and encircling rim portion 26.

In one variant, a laterally directed projection 28 may be formed annularly about an exterior surface of the recessed cup portion 24, typically proximate the encircling rim 26 in a desired location. It is also envisioned that the continuous and laterally directed projection 28 may be substituted by such as one, two or three individual and smaller sized ribs (such as illustrated by phantom marks 28'). It is also envisioned that the ribs may extend in a vertical direction (see also again in phantom at 28") and as may be required. It is also desired that, in achieving the desired forming operation of FIG. 3, gauge of the mesh (metal) substrate 16 be such that it exhibits sufficient strength to prevent the plug from distorting (if required) during subsequent fitting to the vehicle as will now be described.

Figure 4A:
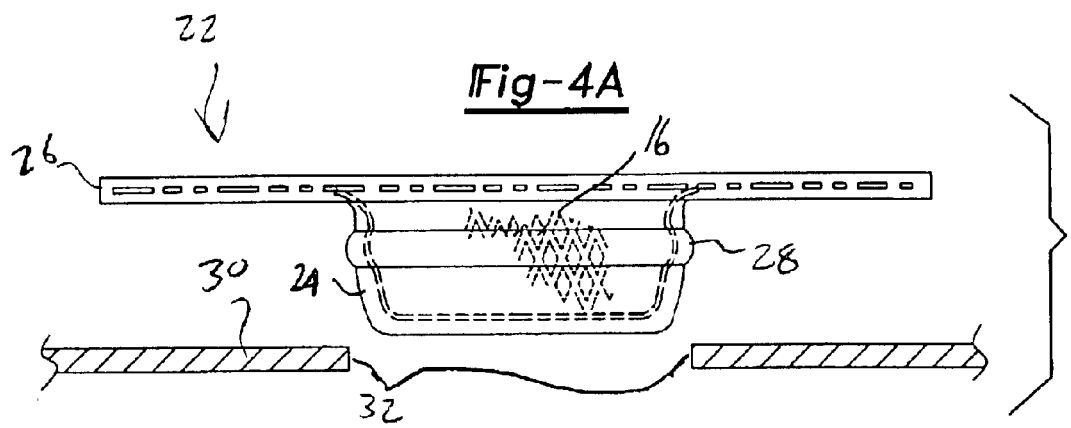
FIG. 4A is an inverted and side cutaway illustration of the composite plug illustrated in FIG. 3 and further showing the plug in a pre-installation position over an existing vehicle aperture.
Figure 4B:
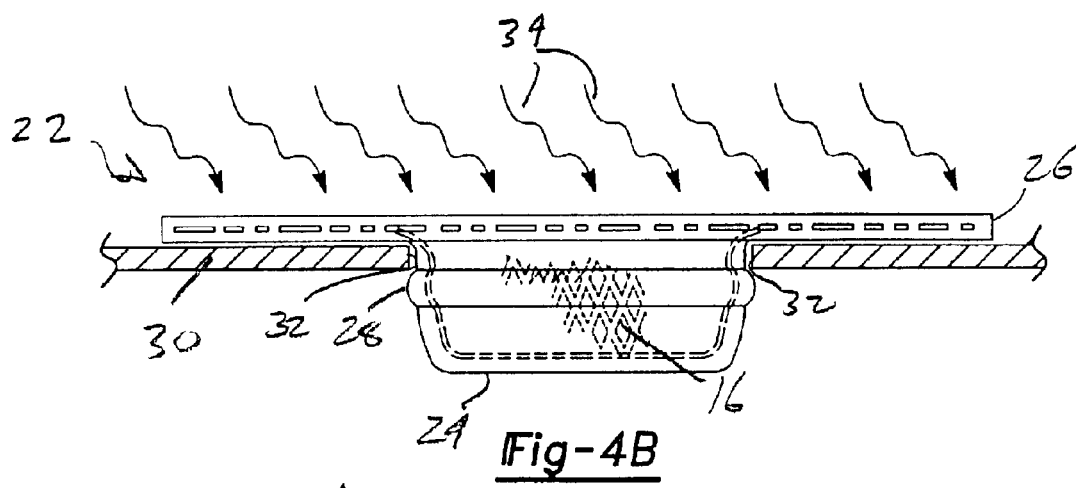
FIG. 4B is a view succeeding that shown in FIG. 4A and further evidencing the composite plug in an installed condition and in which an associated rib(s) snap or interference-fit engaged in biasing fashion over a corresponding and inwardly annularly facing rim of the aperture, as well as further indicating a secondary heat application stage provided to initiate a desired coefficient of thermal expansion of the composite plug to adequately seal and bind about the associated edges of the aperture.

Referring now to FIG. 4A, an inverted and side cutaway illustration is shown of the composite plug 22 illustrated in FIG. 3 and further showing the plug in a pre-installation position over a suitable panel or surface location of a vehicle 30. Referring further to the succeeding view of FIG. 4B, the composite plug 22 is illustrated in an installed condition and in which the projecting ribs 28 are substantially snap-fit or interferenced fit, engaged in biasing fashion over the corresponding and inwardly annularly facing rim 32 of the aperture.

At this stage, a secondary heat application (see convection arrows 34) is provided to again soften the thermoplastic/thermoset material and, in this instance, to a sufficiently molten stage (high bake) in which the material flows both across and over the mesh substrate 16 and around both the hole and the surrounding plate area of the vehicle 30. It is also understood that the secondary heating stage may be provided during a conventional assembly operation of the vehicle, such as a paint bake cycle, and the preferred embodiment contemplates a secondary (or high bake) heating temperature cycle during this stage and typically in a range of approximately 250–350° Fahrenheit.

Although not shown, it is also contemplated that a suitable heat generating article, such as a suitably configured tool (not shown) may also be employed to achieve the desired secondary/high bake cycle and in order to seal and secure the sealant material to and about the vehicle and aperture. It should also be noted that the openings in the mesh substrate should be or a suitable size such that, during the secondary or high bake, the thermoplastic/thermoset (sealer/adhesive) material is prevented from becoming completely detached from the substrate 16.

Figure 4C:
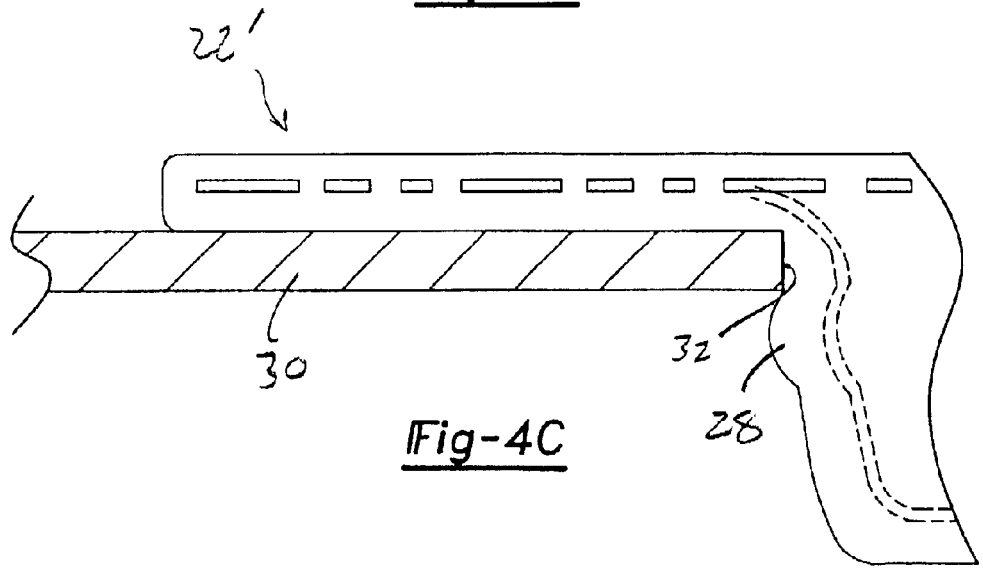
FIG. 4C is an enlarged view of an abutting edge location established between the plug and vehicle aperture and illustrating the sealing and adhering characteristics of the present invention.

As is further shown in FIG. 4C, a further aspect of the second heating stage is the initiation of a desired coefficient of flow and expansion of the thermoplastic/thermoset composite plug 22' in order to adequately seal and bind about the associated edges of the aperture. In particular, the enlarged view of FIG. 4C shows the thermoplastic/thermoset material expanded and sealed against the abutting inwardly facing rim or edge 32 of the vehicle or vehicle plate.

In this fashion, it is desired that the secondary heating process create a bond, after curing and/or cooling, which if required provides sufficient strength to prevent delaminating, especially during uplifting pressure forces exerted by road debris that could impinge the surfaces of the plug. The composite plug should also seal around any painted or coated surfaces into which it is inserted, thus assisting in preventing corrosion. It is also noted that the thermoplastic/thermoset (sealer/adhesive) material may be expandable in nature so that in the bonding process it will expand to seal minor irregularities inherent in and around the vehicle opening 32. As is also understood, the thermoplastic/thermoset material may also exhibit structural characteristics to adding integrity to the assembly.

Figure 5A:
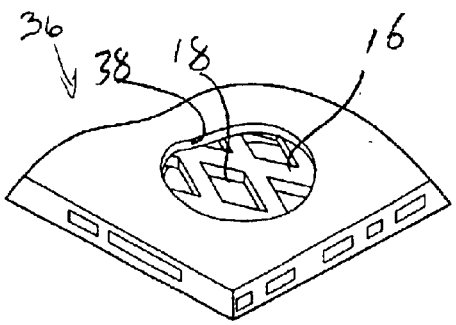
FIG. 5A is an illustration of a thermoplastic/thermoset sheet initially heat encapsulated about a mesh substrate, such as previously illustrated in FIG. 2, and according to a further variant in which an apertured section is formed within the mat configuration revealing the underlying mesh substrate.
Figure 5B:
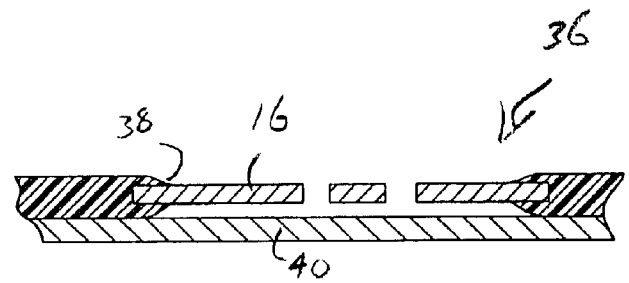
FIG. 5B illustrates a further assembly stage of the pre-formed sheet and substrate of FIG. 5A and in which the mat configuration is placed over a stripped or coated and substantially planar metal surface associated with a vehicle body.

Referring now to FIG. 5A, an illustration is shown at 36 of a thermoplastic/thermoset sheet initially heat encapsulated about the mesh substrate 16, such as previously illustrated in FIG. 2, and according to a further variant in which an apertured section (see inner annular rim 38) is formed within the mat configuration to thereby reveal the underlying mesh substrate. In this fashion, and further referring to FIG. 5B, a further assembly stage is permitted in which the pre-formed sheet and substrate of FIG. 5A is placed over a stripped or coated and substantially planar metal surface 40 associated with the vehicle body and according to a further preferred application.

Figure 5C:
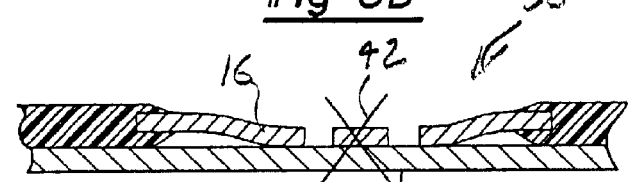
FIG. 5C illustrates a final assembly stage of thermoplastic/thermoset mat and mesh composite of FIGS. 5A and 5B and further in which the exposed metal portions of the mesh screen are welded to the body panel and the mat configuration and the vehicle body are bound together during the secondary heat application stage.

Referring to FIG. 5C, a final assembly stage is illustrated of the thermoplastic/thermoset mat 36' with mesh substrate 16 composite. In this view, the exposed metal portions of the mesh substrate 16 are welded at these points to the panel then the composite thermoplastic material and the associated surface 40 of the vehicle body are bound together, see at 42, during the secondary heat application stage.

Figure 5D:
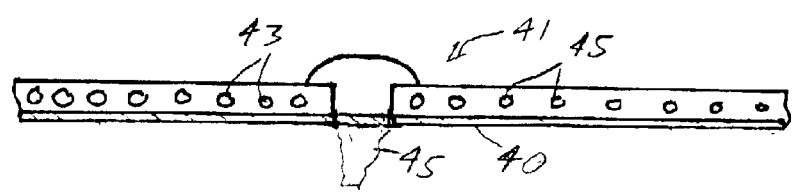
FIG. 5D illustrates a final stage of thermoplastic/thermoset material and mesh composite of FIGS. 5A and 5B and further in which holes are pierced into the composite for fastening to the panel using screw or push-in fasteners, the vehicle panel and composite then being bounded together during the secondary heat application stage.

Referring finally to FIG. 5D, a final assembly stage is illustrated at 41 of the thermoplastic/thermoset mat/mesh composite. In this view, pierced holes 43 and 45 in the sheets of composite are used for fastening the composite to the panel using screw or push-in fasteners 45. The composite and vehicle panel are then bound together during the secondary heat application stage.

Figure 6A:
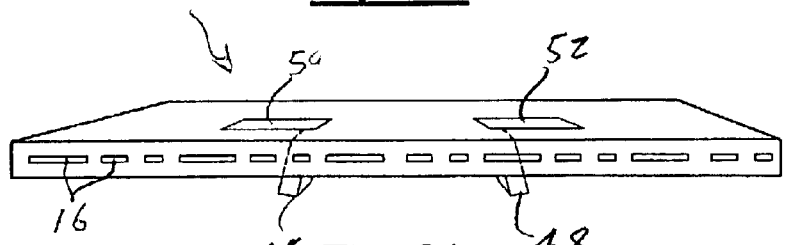
FIG. 6A is further modified variant to that illustrated in FIG. 5A and again showing a thermoplastic/thermoset sheet and encapsulated mesh substrate along with the further provision of angularly disposed tabs extending from a selected lower face of the thermoplastic/thermoset sheet and substrate.
Figure 6B:
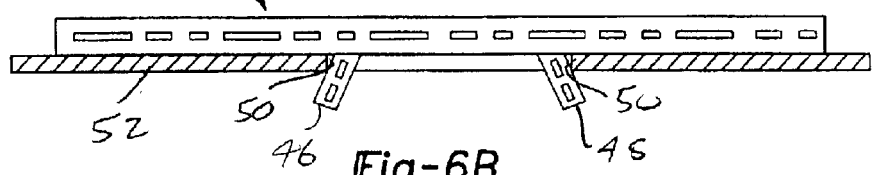
FIG. 6B is an applicational view in side cutaway of the thermoplastic/thermoset sheet with encapsulated mesh substrate as illustrated in FIG. 6A installed about an aperture defined in the vehicle.

Referring now to FIG. 6A, a further modified variant to that illustrated in FIG. 5A is illustrated at 44 and again showing a thermoplastic/thermoset sheet and encapsulated mesh substrate. The sheet and substrate arrangement 44 is similar to that shown at 20 in FIG. 2 (no significant forming or stamping operation being required in this application for redefining the shape of the encapsulating material). Angularly disposed tabs, see at 46 and 48, may extend from a selected lower face or side of the composite and, in use such as is shown in FIG. 6B in applicational side cutaway, grip against the sides or fit into slots in a panel (see rim 50) of a further aperture defined in a plate 52 of the vehicle. As is again shown in FIG. 6A, cutout portions 50 and 52 of the mat and mesh substrate may be employed to create the necessary tabs 46 and 48, and it is further envisioned that the secondary heating stage can reseal the cutout portions by causing the desired re-flowing and thermal expansion of the thermoplastic/thermoset material.

Figures 7, 8A, 8B, 8C:
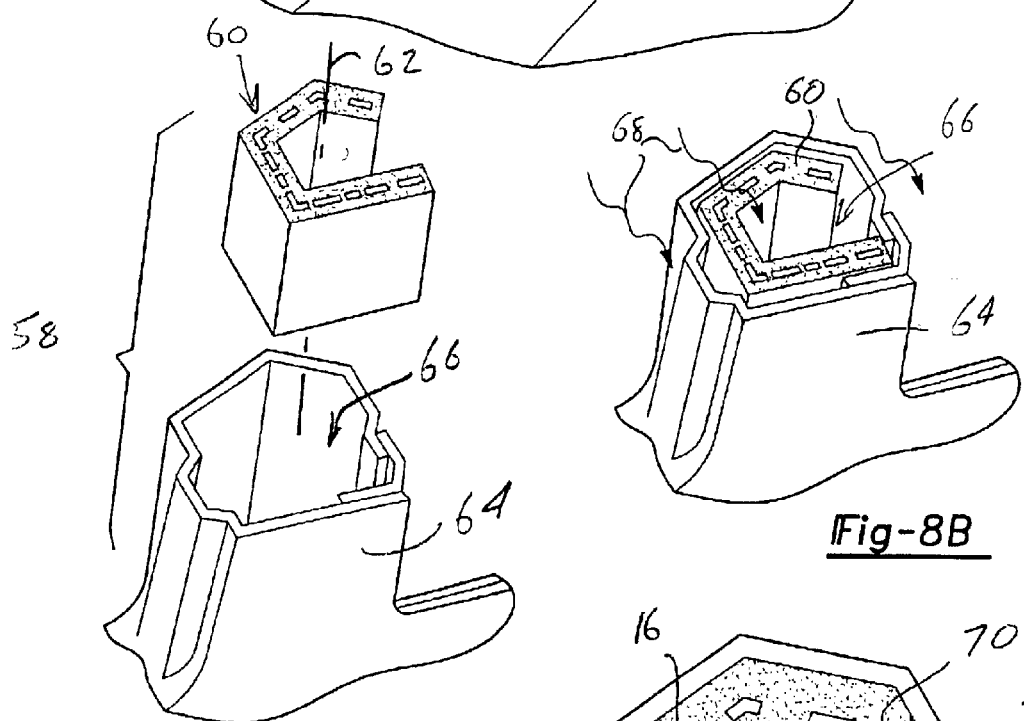
FIG. 7 is a perspective view of additional applications of the composite thermoplastic/thermoset and mesh substrate, these including their formation into the substantial mat configuration for application within such as a vehicle undercarriage panel for sound deadening and/or structural rigidity, as well as in addition to the previously defined variant for plugging such as a fluid drainage hole associated with the vehicle.
FIG. 8A is a first pre-assembly view of an initially manufactured and elongated composite sheet (thermoplastic/thermoset sheet and encapsulated mesh substrate) according to a yet further preferred variant and which is formed or rolled about a generally axially extending direction relative to an interiorly apertured vehicle pillar or clipped, welded or fastened to the side of the cavity.
FIG. 8B is a succeeding assembly view in which the folded composite material is inserted lengthwise into the extending pillar interior and prior to the secondary heat application.
FIG. 8C is final assembly view showing the composite material in a substantially thermally expanded and sealed/ adhered fashion within the pillar and so as to also define a suitable baffle for conduit channeling of fluids from the pillar and/or which offers structural rigidity.

Referring to FIG. 7, a perspective view is illustrated at 54 of a patch or covering representing an additional application of the composite thermoplastic/thermoset and mesh substrate, these again including the formation into the substantial mat configuration for application within such as a vehicle undercarriage recess 56. In this fashion, the patch or covering 54 is used as an NVH (constraint baffle) seal and it is also envisioned that this patch can be used in other areas of the vehicle, such as a plenum.

Additional means of attachment such as including welding, push-in-fasteners, etc., can be used within the skill of one versed in the technical art. The area to be cleared for subsequent application of the patch may also encompass the use of a water jet application to clean or otherwise clear the thermoplastic/thermoset material from the mesh. Pierced holes in the composite can also be used to locate fasteners.

It is also envisioned that the thermoplastic and mesh substrate 54 can provide, in addition to the plug 22' sealing the aperture 32, both heat and acoustical (sound) insulation aspects to such as the undercarriage recess 56 or any other suitable location of the vehicle. Additionally illustrated in FIG. 7 is the previously defined variant of the plug 22' for use in such as the fluid drainage hole associated with the vehicle (see again previous variant of FIGS. 4A–4C).

Referring finally to FIGS. 8A–8C, a final variant is now disclosed of a further application of the invention for use as a baffle in a vehicle pillar. In particular, and referring first to FIG. 8A, a first pre-assembly view is shown at 58 and includes the provision of an initially manufactured and elongated composite sheet, such as previously disclosed and including a combination thermoplastic/thermoset sheet with encapsulated mesh substrate 60. According to this further preferred variant, the composite 60 is formed, folded or rolled about a generally axially extending direction if desired (see axis 62) relative to a vehicle pillar 64 with interiorly defined aperture 66.

Referring now to FIG. 8B, a succeeding assembly view is shown in which the formed composite material 60 is inserted lengthwise into the extending pillar interior 66 and prior to the application of the secondary heating stage (high bake) as shown by convection arrows 68. Finally, and as shown in FIG. 8C, a final assembly view illustrates the composite material in a substantially thermally expanded and sealed/adhered fashion see at 70, within the pillar 64 and so as to also define a suitable baffle (see lengthwise extending aperture 72 defined by the expanded composite) for conduit channeling of fluids from the pillar if desired.

A method for applying the above disclosed composite material during a vehicle manufacturing stage is also disclosed according to the present invention and includes the steps of positioning at least one sheet of a selected thermoplastic/thermoset material against a sheet of a mesh substrate, as well as heating the thermoplastic/thermoset material to a first selected temperature in which the material is caused to flow through the mesh substrate and in order to substantially encapsulate the substrate within the thermoplastic/thermoset material. Additional steps include applying the encapsulating thermoplastic/thermoset material and substrate against a location of the vehicle and heating the encapsulating thermoplastic/thermoset material and substrate to a second selected temperature in which the material is caused to secure to the vehicle.

Yet additional method steps include expanding the encapsulating thermoplastic/thermoset material, once applied to the desired vehicle surface, according to a selected coefficient of thermal expansion, and applying at least one of a stamping operation and a die forming operation after encapsulating the substrate within the thermoplastic/thermoset material and in order to achieve a three-dimensional plug configuration. Further method steps also include introducing at least one laterally directed projection into a recessed cup of a defined plug shape, suitable for resiliently engaging the plug against the inwardly facing surface of the vehicle aperture, as well as forming at least one tab into a selected face of the encapsulating thermoplastic/thermoset material. A further method step again contemplates folding the encapsulating thermoplastic/thermoset material and substrate about an axis prior to insertion and thermal expansion within an interior volume defined in such as a vehicle pillar.

Having described our invention, other and additional preferred embodiments will become apparent to those skilled in the art to which it pertains and without deviating from the scope of the appended claims. Such embodiments are envisioned to include utilizing a thermoset material, in conjunction with or in the place of the preferred thermoplastic material, encapsulating the mesh substrate and capable, upon being heated in a given application, to securely bond and seal to the desired vehicle application.

We claim:

1. A composite material for application during a vehicle manufacturing stage, said composite material comprising:
   a sheet of a selected material comprising at least one of a thermoplastic and a thermoset material and having a selected length, width, and thickness;
   a sheet of a mesh substrate substantially encapsulated within said sheet of the selected material to define said composite material, said sheet of the mesh substrate having a selected length, width, and thickness;
   an initial heat forming stage during which said sheet of the selected material is applied to said sheet of the mesh substrate;
   a forming operation for establishing said composite material in a three-dimensional plug configuration with an encircling rim and centrally recessed cup; and
   said composite material adapted to being secured to a selected location of the vehicle during its manufacture.

2. The composite material as described in claim 1, said forming operation further comprising at least one of a stamping operation and a die forming operation.

3. The composite material as described in claim 1, the vehicle include an aperture defined by at least one inwardly facing surface, said forming operation further comprising the introduction of at least one laterally directed projection into said centrally recessed cup, proximate said encircling rim, and suitable for resiliently engaging said plug against the inwardly facing surface of the vehicle aperture.

4. A composite material for application during a vehicle manufacturing stage, said composite material comprising:
   a sheet of a selected material comprising at least one of a thermoplastic and a thermoset material and having a selected length, width, and thickness;
   a sheet of a mesh substrate substantially encapsulated within said sheet of the selected material, during an initial heat forming stage to define said composite material, said sheet of the mesh substrate having a selected length, width and thickness;
   a forming operation for establishing at least one tab extending from a selected face of said sheet of the selected material; and
   said composite material adapted to being secured to a selected location of the vehicle during its manufacture.

5. A composite material for application during a vehicle manufacturing stage, said composite material comprising:
   a sheet of a selected material comprising at least one of a thermoplastic and a thermoset material and having a selected length, width, and thickness;
   a sheet of a mesh substrate substantially encapsulated within said sheet of the selected material, during an initial heat forming stage to define said composite material, said sheet of the mesh substrate having a selected length, width and thickness;
   an apertured section formed within said sheet of the selected material and revealing a portion of said sheet of the mesh substrate; and
   said composite material adapted to being secured to a selected location of the vehicle during its manufacture.

6. A composite material for application during a vehicle manufacturing stage, said composite material comprising:
   a sheet of a selected material comprising at least one of a thermoplastic and a thermoset material and having a selected length, width, and thickness;
   a sheet of a mesh substrate substantially encapsulated within said sheet of the selected material, during an initial heat forming stage to define said composite material, said sheet of the mesh substrate having a selected length, width and thickness; and
   said composite material adapted to being secured to a selected undercarriage recess location of the vehicle during its manufacture, said sheet of the selected material further being subjected to a secondary beat forming stage subsequent to securing to the selected vehicle location.

7. A composite material for application during a vehicle manufacturing stage, said composite material comprising:
   a sheet of a selected material comprising at least one of a thermoplastic and a thermoset material and having a selected length, width, thickness and further exhibiting a specified coefficient of thermal expansion;
   a sheet of a mesh substrate substantially encapsulated within said sheet of the selected material, during an initial heat forming stage to define said composite material, said sheet of the mesh substrate having a selected length, width and thickness; and
   said composite material adapted to being secured to a selected location of the vehicle during its manufacture, the vehicle including at least one recessed and interiorly extending volume, said sheet of the selected material further being formed about an extending axis prior to insertion and thermal expansion within the interiorly extending volume, associated with a secondary heat forming stage subsequent to securing to the selected vehicle location.

* * * * *